United States Patent
Kawashima

(10) Patent No.: US 9,124,187 B2
(45) Date of Patent: Sep. 1, 2015

(54) CONTROL DEVICE FOR SWITCHING POWER SOURCE

(71) Applicant: Fuji Electric Co., Ltd., Kanagawa (JP)

(72) Inventor: Tetsuya Kawashima, Nagano (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 14/560,452

(22) Filed: Dec. 4, 2014

(65) Prior Publication Data

US 2015/0214845 A1     Jul. 30, 2015

(30) Foreign Application Priority Data

Jan. 28, 2014    (JP) ................................ 2014-013397

(51) Int. Cl.
    *G05F 1/00*        (2006.01)
    *H02M 3/335*     (2006.01)

(52) U.S. Cl.
    CPC ................................ *H02M 3/33507* (2013.01)

(58) Field of Classification Search
    CPC .................................................. H02M 3/33507
    See application file for complete search history.

(56) References Cited

U.S. PATENT DOCUMENTS

| | | | |
|---|---|---|---|
| 5,875,762 A | 3/1999 | Tsuchiya et al. | |
| 7,227,476 B1* | 6/2007 | Wong | 341/53 |
| 2008/0037297 A1* | 2/2008 | Torre et al. | 363/41 |
| 2008/0284397 A1* | 11/2008 | Chang | 323/283 |
| 2008/0303501 A1 | 12/2008 | Prodic | |
| 2008/0310201 A1* | 12/2008 | Maksimovic | 363/85 |
| 2010/0208502 A1* | 8/2010 | Horii | 363/131 |
| 2011/0254523 A1* | 10/2011 | Ito et al. | 323/282 |
| 2015/0035509 A1* | 2/2015 | Koyama et al. | 323/283 |

FOREIGN PATENT DOCUMENTS

| | | |
|---|---|---|
| JP | H01-202038 A | 8/1989 |
| JP | H11-107787 A | 4/1999 |
| JP | 2008-522564 A | 6/2008 |
| WO | 2006/037214 A1 | 4/2006 |

OTHER PUBLICATIONS

Peterchev et al., "Quantization Resolution and Limit Cycling in Digitally Controlled PWM Converters", IEEE Transactions on Power Electronics, Jan. 2003, pp. 301-308, vol. 18, No. 1.
Lukic et al., "High-Frequency Digital Controller for DC-DC Converters Based on Multi-Bit $\Sigma$-$\Delta$ Pulse-Width Modulation", IEEE, 2005, pp. 35-40.

* cited by examiner

*Primary Examiner* — Emily P Pham
(74) *Attorney, Agent, or Firm* — Chen Yoshimura LLP

(57) ABSTRACT

A control device of an insulation type DC/DC converter includes a shunt regulator that detects an error in output voltage at the secondary side of a transformer, a photocoupler that transmits the detected error voltage to the primary side of the transformer, and a DPWM control unit on the primary side that generates a control pulse signal having a pulse width at a duty ratio based on the error voltage. The DPWM control unit includes an A/D conversion circuit, an A/D output stabilization circuit, a dither circuit, and a DPWM circuit. The A/D output stabilization circuit is provided after the A/D conversion circuit, and the output end of the A/D output stabilization circuit is connected to the input end of the dither circuit.

18 Claims, 12 Drawing Sheets

| Input | Internal Data | | Dither Sum dsum | | | | 4 Period Average Output |
|---|---|---|---|---|---|---|---|
| Dn[9:0] | Dn[9:2] | Dn[1:0] | Period p | Period p+1 | Period p+2 | Period p+3 | |
| 400 | 100 | 0 | 0 | 0 | 0 | 0 | 100 |
| 401 | | 1 | 1 | 0 | 0 | 0 | 100 + 0.25 |
| 402 | | 2 | 1 | 0 | 1 | 0 | 100 + 0.5 |
| 403 | | 3 | 1 | 1 | 1 | 0 | 100 + 0.75 |
| 404 | 101 | 0 | 0 | 0 | 0 | 0 | 101 |
| 405 | | 1 | 1 | 0 | 0 | 0 | 101 + 0.25 |
| 406 | | 2 | 1 | 0 | 1 | 0 | 101 + 0.5 |

FIG. 9C

CONTROL DEVICE FOR SWITCHING POWER SOURCE

BACKGROUND OF THE INVENTION

1. Technical Field

The present invention relates to a control device for mitigating output voltage oscillation in a switching power source that performs digital control.

2. Background Art

As shown in FIG. 6, conventional insulation type DC/DC converters include, in the secondary side of a transformer that outputs a prescribed voltage, a shunt regulator 710, an error amplifier, or the like that outputs an error voltage in which a difference between the output voltage and a target voltage is amplified, and additionally include an insulating element such as a photocoupler 720 or the like for sending the detected error voltage to the primary side of the transformer.

The primary side of the transformer includes a pulse width modulation (PWM) circuit 730, which generates a control pulse signal having a pulse width at a duty ratio based on the error voltage, and a desired output voltage is attained by controlling a switching element by the generated control pulse signal through a driver circuit 800.

PWM control is one example here, but it is also possible to use pulse frequency modulation (PFM) control by which it is possible to change the frequency or period of a pulse signal, and in such a case, the PWM control circuit 730 simply needs to be replaced with a PFM control circuit. In the description below, circuits that generate a control pulse signal are generally referred to as PWM control circuits.

In recent years, there has been a tendency for digital control to be performed for DC/DC converters. FIG. 7 shows an example of a configuration of a conventional insulation type DC/DC converter and a fully digital control device 900. A fully digital power source is proposed in which a control pulse signal is generated by providing a reference voltage source 911, an analog/digital (A/D) conversion circuit 912, a digital arithmetic circuit 913, and a digital PWM (DPWM) circuit 914 on the secondary side. Also, in the same fully digital power source, a method is proposed in which the output voltage is sent as feedback to the primary side using an analog isolation amplifier, and a control pulse signal is generated at the A/D conversion circuit, the digital arithmetic circuit, and the DPWM circuit, which are located at the primary side.

Various other configurations are possible for the digital power source, but an optimal configuration is selected based on the cost of parts and conversion efficiency. FIG. 8 shows an example of a configuration of a portion of a conventional insulation type DC/DC converter 300 and a control device 1000 that is of a digital control type. Similar to FIG. 6, a shunt regulator 1010 is disposed on the secondary side in order to generate an error voltage, with the insulating element being a photocoupler 1020, and the PWM control unit 1030 on the primary side is digital. In this case, the PWM control unit 1030 is constituted of an A/D conversion circuit 1031 that converts the error voltage to a digital value and a DPWM circuit 1032 that converts this digital value to a control pulse signal having a duty ratio or frequency based on the digital value obtained by A/D conversion.

In this configuration, the PWM control unit 1030 generates a control pulse signal such that the error voltage becomes zero, but depending on the response time of the A/D conversion circuit 1031 and the minimum variation width of the control pulse signal, which depends on the resolution of the A/D conversion circuit 1031 and the DPWM circuit 1032, the output voltage can oscillate around the target voltage. This is because, in the shunt regulator 1010, the difference between the output voltage and the target voltage is amplified at an amplification factor of a certain size in order for the output voltage Vout from the DC/DC converter 300 to be outputted at high accuracy. Thus, if there is even a small difference between the output voltage and the target voltage, a signal exceeding a resolution $\Delta ADC$ of the A/D conversion circuit oscillating to the other side of the target is inputted to the A/D conversion circuit 1031. In such a circuit configuration, it is not possible to reduce the output voltage oscillation to zero, but by making the A/D conversion circuit 1031 and the DPWM circuit 1032 high resolution to reduce the minimum variation width of the control pulse signal, it is possible to mitigate oscillation.

However, if the number of bits of data used in a digital counter type DPWM circuit is increased by Npwm, then the control clock needs to be multiplied by 2 to the Npwm power, and thus, power consumption increases. Another DPWM circuit configuration is the direct line configuration, but this increases the area taken up by the DPWM circuit.

The resolution of the DPWM, the power consumption, and the circuit design have a tradeoff relation, and various circuit configurations have been proposed, one of these being a DPWM method using a digital dither (see Non-Patent Document 1). The DPWM configuration using a digital dither uses a low resolution DPWM circuit, but attains an accuracy of equally high resolution when an average is taken over a few to a dozen switching periods.

FIG. 9A shows a configuration of a typical digital dither circuit. A k bit digital arithmetic output is split by a data conversion circuit 1110 to a lower digit bit m and an upper digit bit n, and an M bit dither pattern generating circuit 1120 receives the present switching frequency information and the value of the lower digit m and outputs a 1 bit signal dsum (dither sum). This dsum is added to the upper digit bit n every switching period in an adder circuit 1130, and the sum is sent to the n bit DPWM circuit 1140 to generate a control pulse signal.

An example will be described in which an 8 bit DPWM circuit and a 2 bit dither circuit generates a control pulse signal based on a 10 bit input. FIG. 9B shows control pulse signals to which the dithers are added, and FIG. 9C shows the dither sums. In this case, the dither sum is a value of 0 or 1 during one period, but attains a four period average sum of 0, 0.25, 0.5, or 0.75, which means the accuracy increases fourfold. In other words, an 8 bit DPWM circuit achieves a 10 bit accuracy on average, and it is possible to increase the resolution (10 bit equivalent) while reducing the power consumption (8 bit circuit equivalent).

In the DPWM method using a digital dither of the related art, based on the example of FIG. 9B, it is assumed that the input is constant over the four periods during which the dither sum is determined. Therefore, in the case of a fully digital power source such as that shown in FIG. 7 in which the digital signal inputted in a normal state is constant, the difference between the output voltage and the target voltage is inputted to the A/D conversion circuit 912 at an amplification factor of 1, and thus, normally, the input variation can be ignored by the A/D conversion circuit 912 (variation width is less than the resolution $\Delta ADC$ of the A/D conversion circuit), which has the advantage of improving output voltage accuracy.

Also, Patent Documents 1 and 2 respectively disclose a method of transmitting the A/D conversion result to which the digital dither method is applied, and an engine control device.

RELATED ART DOCUMENTS

Patent Documents

Patent Document 1: Japanese Patent Application Laid-Open Publication No. H01-202038
Patent Document 2: Japanese Patent Application Laid-Open Publication No. H11-107787

Non-Patent Documents

Non-Patent Document 1: Angel V. Peterchev, Seth R. Sanders, "Quantization Resolution and Limit Cycling in Digitally Controlled PWM Converters", IEEE Transactions on Power Electronics, January, 2003, Vol. 18, No. 1, pp. 301-308

SUMMARY OF THE INVENTION

However, in a configuration in which a shunt regulator and digital control unit are combined as shown in FIG. 8, the output voltage oscillates as described previously, and even in a normal state, the A/D conversion output (DPWM input) does not remain constant. In other words, the input during the period during which the dither sum is determined does not necessarily remain constant, and therefore, variation in A/D conversion output and the dither sum are added together, and a pulse signal having an unexpected duty ratio is outputted. As a result, the intended effect of adding the dither is not attained, and the output oscillation width in a configuration in which an 8 bit DPWM circuit and a 2 bit dither circuit are used, for example, is greater than or equal to the oscillation width of the 8 bit DPWM circuit alone.

Neither Patent Document 1 nor 2 mentions the problem above.

The present invention takes this problem into account, and an object thereof is to provide a control device for a switching power source that detects an error in voltage outputted from the switching power source and reduces output voltage oscillation occurring when a control pulse signal is generated by an analog/digital conversion circuit and a DPWM circuit on the primary side of a transformer.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a control device for a switching power source of the present invention, including: an error amplifier that amplifies a differential between a voltage outputted from a switching power source and a reference voltage; an analog/digital converter that converts the differential amplified by the error amplifier to a digital signal; an analog/digital output stabilization circuit that outputs an updated digital signal equal to a current digital signal outputted from the analog/digital converter if the digital signal from the analog/digital converter changes more than a prescribed threshold; a digital dither circuit that splits a K bit digital signal outputted from the analog/digital output stabilization circuit to an upper digit N bit digital signal and a lower digit M bit digital signal, generates a 1 bit digital signal representing a dither sum on the basis of the lower digit M bit digital signal and switching frequency data, adds the upper digit N bit digital signal to the 1 bit digital signal, and outputs a digital signal obtained by the addition; and a digital pulse width modulation circuit that generates a control pulse signal for driving the switching power source on the basis of the digital signal outputted from the digital dither circuit.

In another aspect, the present disclosure provides the control device, wherein the K bits is equal to a sum of the N bits and the M bits.

In another aspect, the present disclosure provides the control device, wherein an absolute value of the threshold is 2 LSB or greater.

In another aspect, the present disclosure provides the control device, wherein the digital pulse width modulation circuit includes a comparison circuit that compares a signal outputted from a digital counter circuit to which a square wave outputted from a square wave oscillator is inputted, and a signal outputted from the digital dither circuit.

In another aspect, the present disclosure provides the control device, further including: an insulating element provided between the error amplifier and the analog/digital converter.

In another aspect, the present disclosure provides the control device, wherein the switching power source is an insulation type DC/DC converter.

The present invention can detect an error in output voltage using a shunt regulator on the secondary side of a transformer of a switching power source, and reduce oscillation in output voltage, which occurs when a control pulse signal is generated by an analog/digital conversion circuit and a DPWM circuit on the primary side of the transformer, without a large increase in power consumption or area taken up by the circuit.

It is to be understood that both the foregoing general description and the following detailed description are exemplary and explanatory, and are intended to provide further explanation of the invention as claimed.

BRIEF DESCRIPTION OF THE DRAWINGS

FIG. 9C shows dither sums.

DETAILED DESCRIPTION OF EMBODIMENTS

Figure 1:
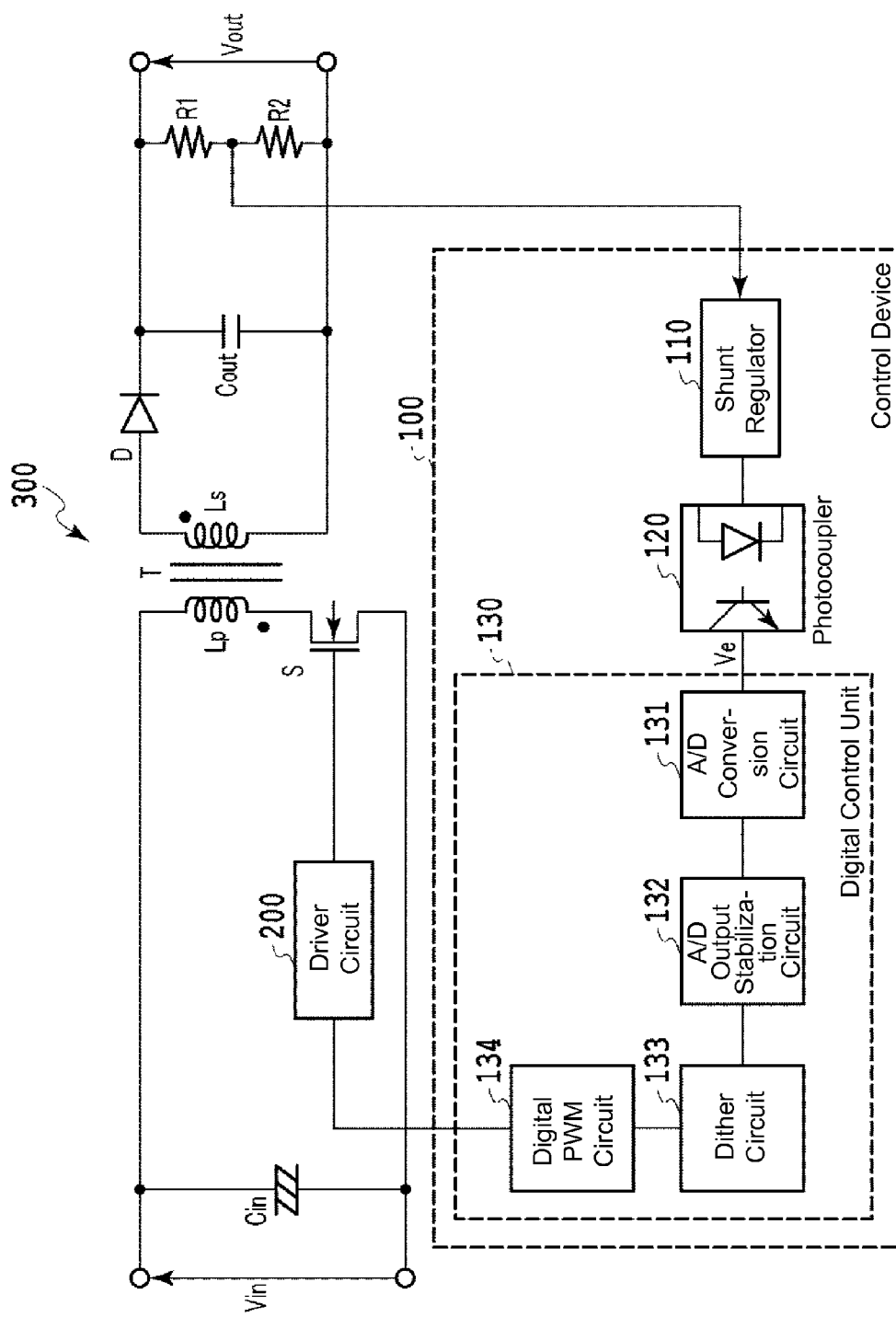
FIG. 1 shows a configuration of an insulation type DC/DC converter and a control device thereof according to one embodiment of the present invention.

FIG. 1 shows an insulation type DC/DC converter and a control device thereof according to one embodiment of the present invention. A control device 100 of an insulation type DC/DC converter 300 includes a shunt regulator 110 that detects an error in output voltage at the secondary side of a transformer, a photocoupler 120 that transmits the detected error voltage to the primary side of the transformer, and a DPWM control unit 130 on the primary side that generates a control pulse signal having a pulse width at a duty ratio based on the error voltage.

The DPWM control unit 130 includes an A/D conversion circuit 131, an A/D output stabilization circuit 132, a dither circuit 133, and a DPWM circuit 134. The A/D output stabilization circuit 132 is provided after the A/D conversion circuit 131, and the output end of the A/D output stabilization circuit 132 is connected to the input end of the dither circuit 133.

Figure 9A:
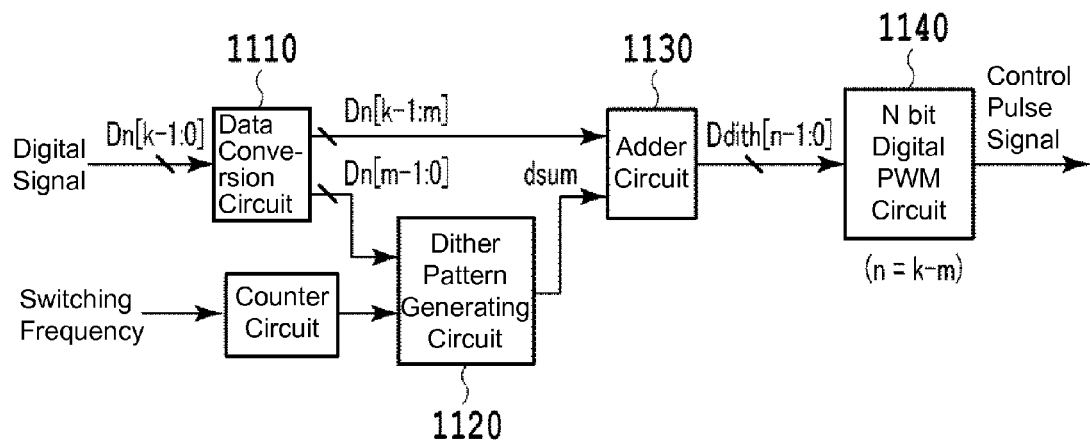
FIG. 9A shows a configuration of a typical digital dither circuit.
Figure 9B:
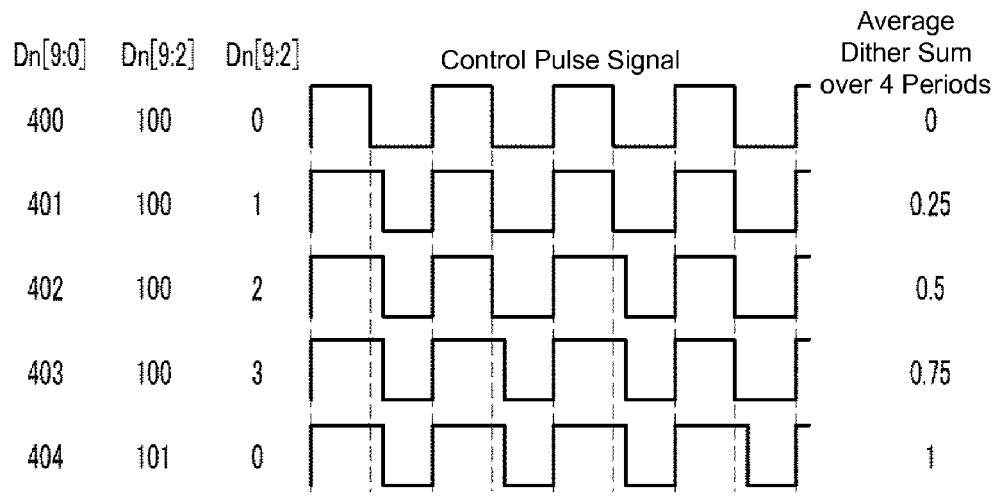
FIG. 9B shows control pulse signals to which dithers are added.

In an embodiment of the present invention also, the dither circuit 133, as shown in FIG. 9A, includes a data conversion circuit 1110 that splits data into an upper digit bit and a lower digit bit, a lower digit bit dither pattern generating circuit 1120, and an adder circuit 1130 that adds the upper digit bit to the output from the lower digit bit dither pattern generating circuit.

The DPWM control unit 130 generates a control pulse signal having a pulse width at a duty ratio based on the error voltage, and turns ON and OFF a switching element using the control pulse signal through a driver circuit 200, thereby controlling the output voltage.

Figure 2A:
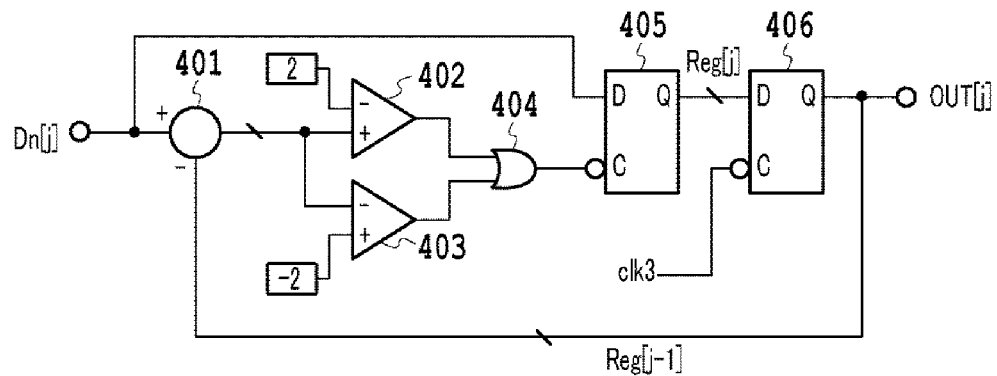
FIG. 2A shows a portion of a configuration of an A/D output stabilization circuit 132 according to one embodiment of the present invention.
Figure 2B:
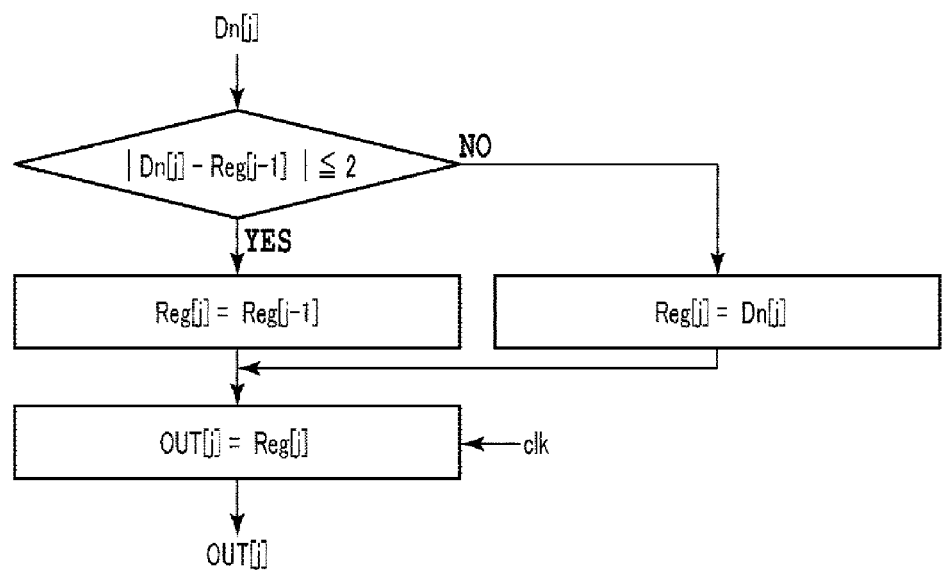
FIG. 2B is a flow chart showing an operation of the A/D output stabilization circuit.

FIG. 2A shows a portion of a configuration of the A/D output stabilization circuit 132 of one embodiment of the present invention, and FIG. 2B shows a flow chart of an operation of the A/D output stabilization circuit 132. A subtractor circuit 401 generates a difference between an output Dn[j] of the A/D conversion circuit 131 and an output OUT[j]=Reg[j−1] of the A/D output stabilization circuit 132 (an n bit output from a D flip-flop 405, j being the number of clock signals inputted to an input end C of the D flip-flop 406), and the output end of the subtractor circuit 401 is connected to a non-inversion input end of a comparison circuit 402 (which compares digital data), which is set at an inversion input of +2 LSB, and an inversion input end of comparison circuit 403 (which compares digital data) set at a non-inversion input of −2 LSB. Here, the threshold values are set at +2 LSB and −2 LSB, but may be set to any appropriate value.

The output ends of the comparison circuit 402 and 403 are respectively connected to input ends of the OR circuit 404, and the output end of the OR circuit 404 is connected to an input end C of the D flip-flop 405. The input end D of the D flip-flop 405 is connected to the output end of the A/D conversion circuit 131.

If the outputs from the comparison circuits 402 and 403 are both low, or in other words, if the difference remains within the range of +2 LSB to −2 LSB, the OR circuit 404 outputs "low," and the output Q from the D flip-flop 405 does not change regardless of the input D. If one of the outputs from the comparison circuits 402 and 403 is high, or in other words, if the difference is not within the range of +2 LSB and −2 LSB, then the OR circuit 404 outputs "high," and at that time, the D flip-flop 405 reads in an output Dn[j] from the A/D conversion circuit 131, and outputs this as Reg[j].

The input end D of the D flip-flop 406 is connected to the output end Q of the D flip-flop 405 (Reg[j]), a clock signal is inputted to the input end C, and the D flip-flop 406 reads in the output Q from the D flip-flop 405 in synchronization with the clock signal. The D flip-flop 406 outputs Reg[j−1] until it reads in the output Q. Here, the clock signal inputted to the input end C of the D flip-flop 406 is an output signal clk3 of a clock signal generating unit, which is not shown. The clock signal generating unit is a circuit that generates three or more different types of clock signals (clk1, clk2, clk3, etc.) with the fall of a PWM signal outputted by the digital PWM circuit 134 in FIG. 1 being the starting point, in order to start the digital circuit sequence. The clock signals clk1, clk2, and clk3 rise in that order such that the outputted clock signal clk1 rises after 1 μs, for example, from the fall of the PWM signal, clk2 rises 1 μs after clk1 rises, and clk3 rises 1 μs after clk2 rises. Also, all clock signals rise before the PWM signal rises, and fall simultaneously to the rise of the PWM signal.

In order for the A/D conversion circuit 131, which is provided before the A/D output stabilization circuit 132, to determine the output signal D[j] when the output clk2 from the clock signal generating unit rises, the operation of the A/D output stabilization circuit 132 in FIG. 2A from the subtractor 401 to the flip flop 405 must be performed with a gap of 1 μs or less between the clock signals clk2 and clk3.

Also, FIG. 2A shows one each of the D flip-flops 405 and 406, but the number n of D flip-flops is equal to the number of bits n.

The A/D output stabilization circuit 132 does not change the output from the A/D conversion circuit 131 as long as the output does not vary by more than the set value. As a result, the period during which the signal inputted to the DPWM circuit 134 is constant becomes longer, and during this period, the intended dither sum is added to this inputted signal to form the control pulse signal; therefore, it is possible to attain an output voltage having approximately the same stability as in a high resolution configuration.

Below, an embodiment of the present invention will be explained in detail.

Figure 3:
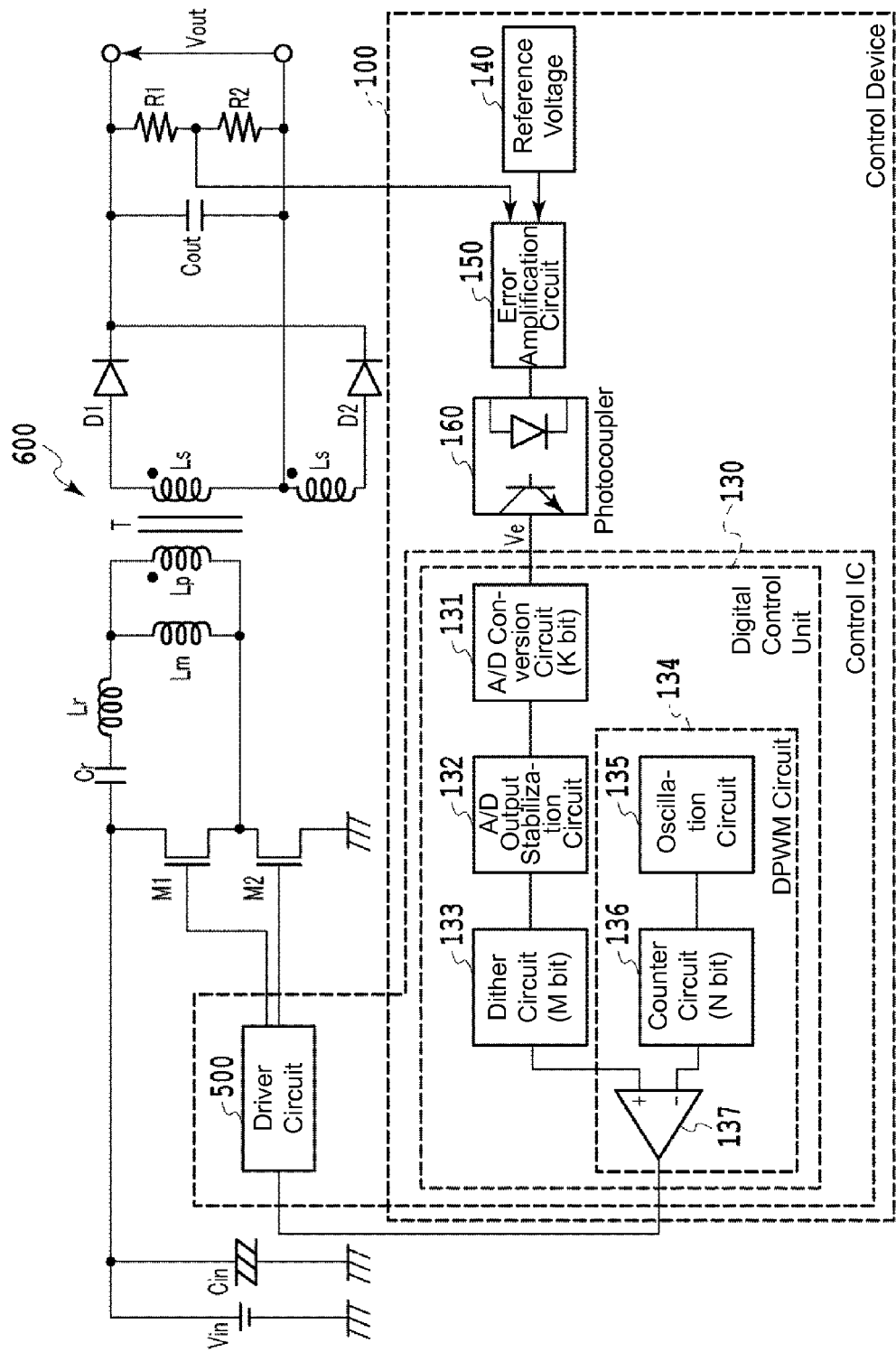
FIG. 3 shows a configuration of an insulation type DC/DC converter and a control device thereof according to one embodiment of the present invention.

FIG. 3 shows an insulation type DC/DC converter and a control device thereof according to one embodiment of the present invention. Here, the main circuit is a resonance type DC/DC converter 600 as an example of an insulation type DC/DC converter. An error amplification circuit 150 (or shunt regulator), which detects an error between the output voltage Vout and a reference voltage source 140, is disposed on the secondary side of the transformer, which is the output side, and transmits an error voltage signal to the primary side through a photocoupler 160. The digital control unit 130 disposed on the secondary side includes a K bit A/D conversion circuit 131, and A/D output stabilization circuit 132, an M bit dither circuit 133, and an N bit DPWM circuit 134.

The N bit DPWM circuit 134 includes a square wave oscillation circuit 135, an N bit counter circuit 136, and a comparison circuit 137 that compares the output from the M bit dither circuit 133 and the output from the N bit counter circuit 136. The N bit DPWM circuit 134 outputs a control pulse signal having a duty ratio or frequency based on the error voltage. The relation between the number of bits is as follows: K=M+N.

The comparison circuit 137 compares the size relation between the output from the dither circuit 133 and the output from the counter circuit 136. The comparison circuit 137 outputs "L" when the output of the dither circuit 133 is larger than the output of the counter circuit 136, and if the size relation inverts, then the comparison circuit 137 outputs "H."

The output from the comparison circuit is the PWM signal output from the DPWM circuit 134.

The DPWM circuit 134 has a second comparison circuit that is not shown, and this second comparison circuit compares the output from the dither circuit 133 multiplied by two and the output of the counter circuit 136 order to form a PWM signal having a 50% duty ratio. If the output from the dither circuit 133 multiplied by two exceeds the output of the counter circuit 136, then the second comparison circuit outputs "H." The output from the second comparison circuit is inputted to a reset terminal of the counter circuit 136, and the output of the counter circuit 136 is reset when the reset signal becomes "H." As a result of the counter circuit 136 being reset, the output from the comparison circuit, which had been outputting "H" until now, switches to "L."

The OFF period of the PWM signal (period during which the PWM signal is "L") can be determined by the comparison circuit, and the ON period (period during which the PWM signal is "H"), which is equal in length to the OFF period, can be determined by the second comparator, and a PWM control signal having a duty ratio of 50% and a period based on the output from the dither circuit 133 can be generated.

The number of bits of the DPWM circuit can be reduced by the number of bits of the dither circuit, and thus, in the present invention, the power consumption of the DPWM circuit can be reduced to $1/(2^M)$ times compared to a case in which a K bit DPWM control circuit is used.

The control pulse signal is inputted to the driver circuit 500, and the switching element is switched ON/OFF by the output from the driver circuit 500, thus controlling the output voltage. Here, the digital control unit 130 and the driver circuit 500 disposed on the primary side are integrated.

Operations of the respective parts will be described while comparing the present invention to a conventional example, with the number of bits being as follows: K=12, M=2, N=10.

Figures 4A, 4B:
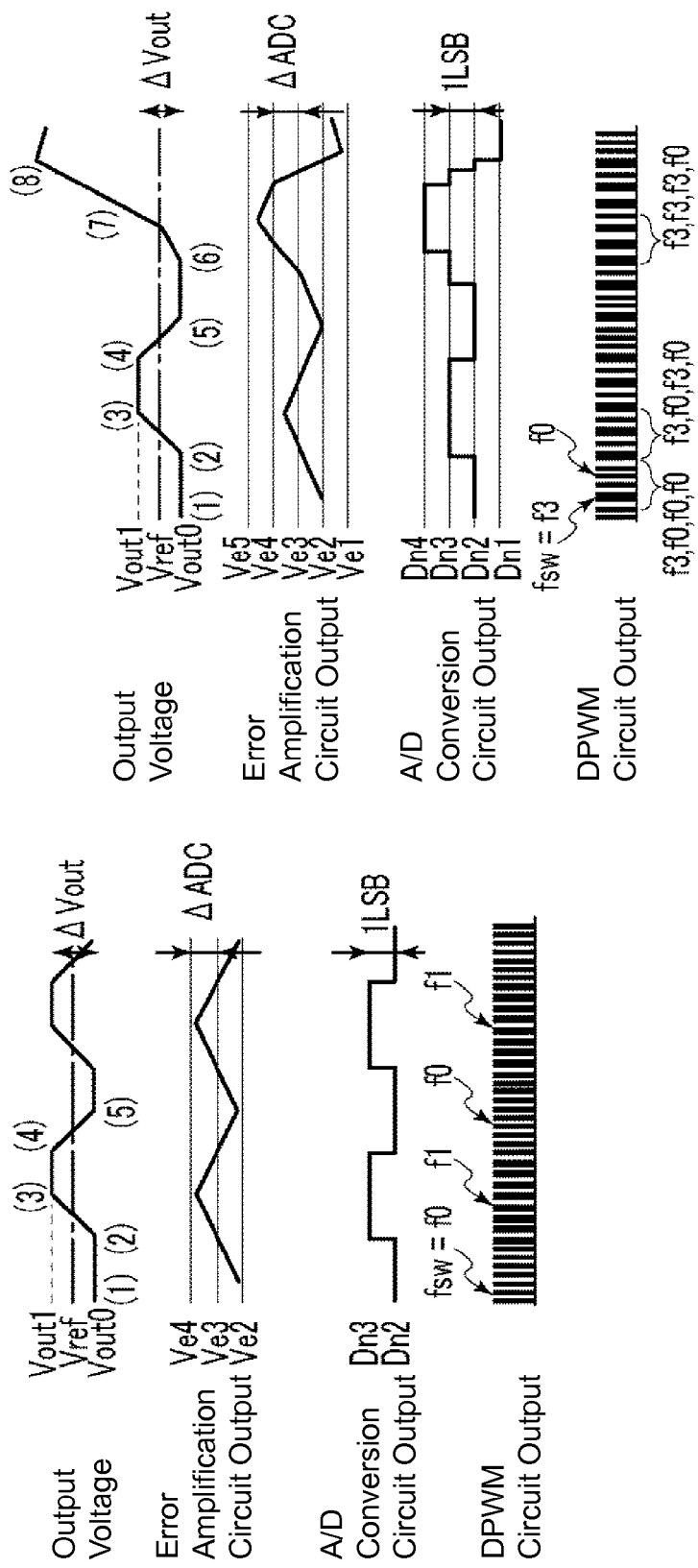
FIG. 4A shows an operation of a conventional configuration in which the A/D output stabilization circuit 132 and a dither circuit 133 are omitted from the configuration of FIG. 3.
FIG. 4B shows an operation of a configuration in which a 2 bit dither circuit is added to the configuration of FIG. 4A.

FIG. 4A shows an operation in a conventional configuration in which the A/D output stabilization circuit 132 and the dither circuit 133 are removed from the configuration of FIG. 3. In such a case, the A/D conversion circuit and the DPWM circuit are both 12 bits. The error amplifier (here, the shunt regulator is also considered to be an error amplifier) outputs an error amplifier output voltage by detecting the error between the output voltage and a reference voltage.

If the output voltage is Vout0, which is lower than the target voltage Vref as in (1) in FIG. 4A, the error amplifier raises the error voltage Ve, but until the change in error voltage Ve exceeds the resolution ΔADC of the A/D conversion circuit, the output from the A/D conversion circuit does not change. Thus, the control pulse signal (refers to the duty ratio or the frequency; in this case, the frequency) from the DPWM circuit remains at f0, and the output voltage does not change either; therefore, the output from the error amplifier continues rising.

Here, if the error voltage changes by ΔADC as in (2) to (3) in FIG. 4A, then the output from the A/D conversion circuit increases by 1 LSB, and as a result, the frequency of the control pulse signal from the DPWM circuit decreases by Δfsw to f1, resulting in the output voltage rising by ΔVout. At this time, the outputted voltage does not completely match the target voltage Vref due to quantization error in the DPWM circuit, and the output voltage Vout1 exceeds the target voltage as in (3) of FIG. 4A.

Thus, the error amplifier starts to decrease Ve in order to lower the output voltage, but the output from the A/D conversion circuit does not change until the error voltage Ve decreases beyond the resolution of the A/D conversion circuit as in (4). At this time also, the output voltage does not completely match the target voltage as in (5) due to the quantization error in the DPWM circuit, and the output voltage decreases to Vout0, which is lower than the target voltage Vref.

This repeats, which causes the output voltage to have a waveform that oscillates around the target voltage Vref. If the resolution of the DPWM circuit is low, then the 1 LSB fluctuation Δfsw of the output from the DPWM circuit becomes large, and the fluctuation ΔVout in the output voltage becomes large.

Next, the operation of a configuration in which a 2 bit dither circuit is added to the configuration in FIG. 4A is shown in FIG. 4B. The number of bits of the DPWM circuit can be decreased by 2 bits down to 10 bits, and thus, the power consumption of the DPWM unit can be reduced to ¼. During (1) to (2) and (3) to (4) in FIG. 4B, the input to the dither circuit (output from the A/D conversion circuit) is constant, and thus, the dither circuit can operate normally, and due to the output from the A/D conversion circuit, the output voltage can be maintained at Vout0 or Vout1 by changing the frequency of the control pulse signal to f0 or f3 according to a Dn2 pattern (f3-f0-f0-f0- . . . ) corresponding to the output Dn2 from the A/D conversion circuit during (1) to (2), and according to a Dn3 pattern (f3-f0-f3-f0- . . . ) corresponding to the output Dn3 from the A/D conversion circuit.

At this time, the Δfsw for each period, which is the difference between the frequencies f0 and f3, is larger compared to a case in which the 12 bit DPWM not provided with a dither is used (four time the value when a 12 bit DPWM is used), but the average Δfsw over four periods is equal to that of the 12 bit DPWM, and thus, it is possible to keep the oscillation of the output voltage to ΔVout similar to when the 12 bit DPWM circuit is used.

A case such as shown in (5) to (6) will be considered in which the A/D conversion circuit output changes in the middle of the dither pattern including four periods as one set. Specifically, the output from the A/D conversion circuit is Dn2, and thus, the dither circuit attempts to maintain the output voltage at Vout0 by outputting a control pulse signal at the Dn2 pattern (f3-f0-f0-f0- . . . ). However, if the A/D conversion circuit output changes from Dn2 to Dn3 in the third period, for example, then until the third period, the control pulse signal is outputted at f3-f0-f0 according to the output Dn2 from the A/D conversion circuit, but starting at the fourth period, the control pulse signal enters a dither pattern (f3-f0-f3-f0- . . . ) due to the output Dn3 from the A/D conversion circuit, and thus, the control pulse frequency pattern starting at (5) changes to the following pattern: f3-f0-f0-f3-f0-f3-f0-f3-f0- . . . . Thus, compared to (1) to (2), the operation is performed at the frequency f3 more frequently, and thus, the output voltage beings to rise as in (6), but the output voltage does not change abruptly due to delays and the like in the output capacitor and the switching element, and therefore, the output voltage continues to remain below Vref. Thus, the output from the error amplification circuit continues to rise, and the output from the A/D conversion circuit rises to Dn4.

As a result, the frequency pattern due to the dither enters the Dn4 pattern (f3-f3-f3-f0- . . . ), and the operation is performed more at the frequency f3 than in the Dn3 pattern of (3) to (4), and the output voltage rises to an even higher voltage than Vout1 as in (7). Due to the response characteristics of the error amplification circuit, the output from the error amplification circuit does not fall abruptly, and thus, the control pulse signal continues operation with the control pulse signal pattern being at the Dn4 pattern with the frequency f3 occurring frequently with Vout remaining high. Therefore, the output voltage continues to rise to a voltage much greater than the target voltage Vref as in (8).

Then, as a result of a decrease in the output from the error amplification circuit, the output from the A/D conversion circuit also decreases, and the frequency of the control pulse signal rises, which causes the output voltage to begin decreasing towards Vref.

The change in control pulse signal in response to the output from the error amplifier is delayed or the response is excessive, which means that the average output voltage does not occur as intended by the dither, and the oscillation width of the output voltage is greater than or equal to a case in which only a 10 bit DPWM circuit is used.

Figure 4C:
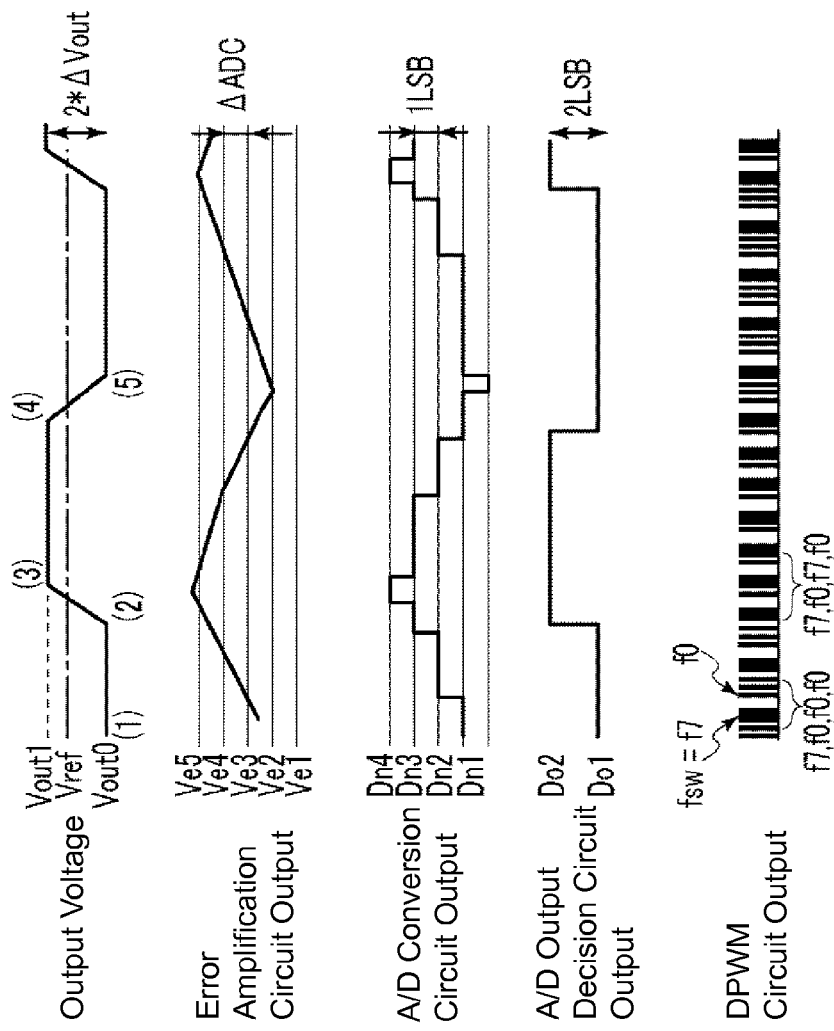
FIG. 4C shows an operation of the configuration of the present invention in which the A/D output stabilization circuit 132 is added after the A/D conversion circuit 131 as shown in FIG. 3.

FIG. 4C shows an operation of a configuration of the present invention in which the A/D output stabilization circuit 132 is provided after the A/D conversion circuit 131 as shown in FIG. 3. The operation up to when the error amplifier 150 performs feedback, which is then detected by the A/D conversion circuit 131, is the same as in conventional devices, but as a result of the A/D output stabilization circuit 132, the configuration and operation sequence thereof being shown in FIGS. 2A and 2B, the output does not change unless the output from the A/D conversion circuit 131 changes by a value greater than or equal to 2 LSB. As a result, the output voltage does not change if the output from the A/D conversion circuit 131 changes by only 1 LSB, and thus, as shown in FIG. 4C, the period of (1) to (2) can be lengthened. During the period (1) to (2), the dither circuit 133 operates normally according to the intended pattern, and the DPWM circuit 134 operates at the same accuracy as in a 12 bit configuration in combination with the dither.

During (2) to (3) in FIG. 4C, the amount by which the error voltage increases exceeds 2×ΔADC, resulting in the input to the DPWM circuit 134 changing for the first time. The amount of change is 2 LSB, and thus, this theoretically means that the amount of change in the output voltage increases by twofold compared to the 12 bit configuration. In other words, with the combination of the A/D output stabilization circuit 132 and the 2 bit dither circuit 133, the accuracy is reduced to half, but the power consumption is reduced to ¼.

Figures 5A, 5B:
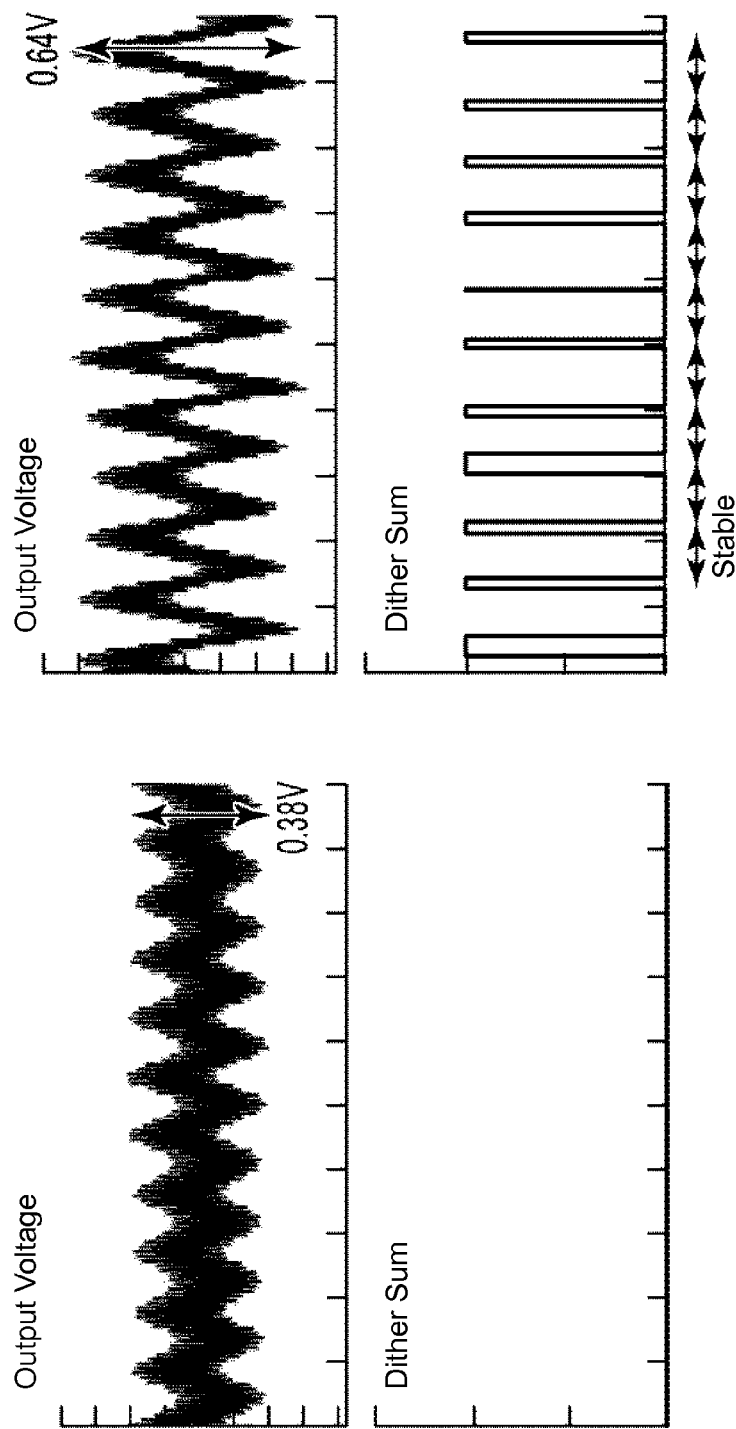
FIGS. 5A to 5C show simulation results and dither sums of output voltages in the same configurations as shown in FIGS. 4A to 4C.
Figure 5C:
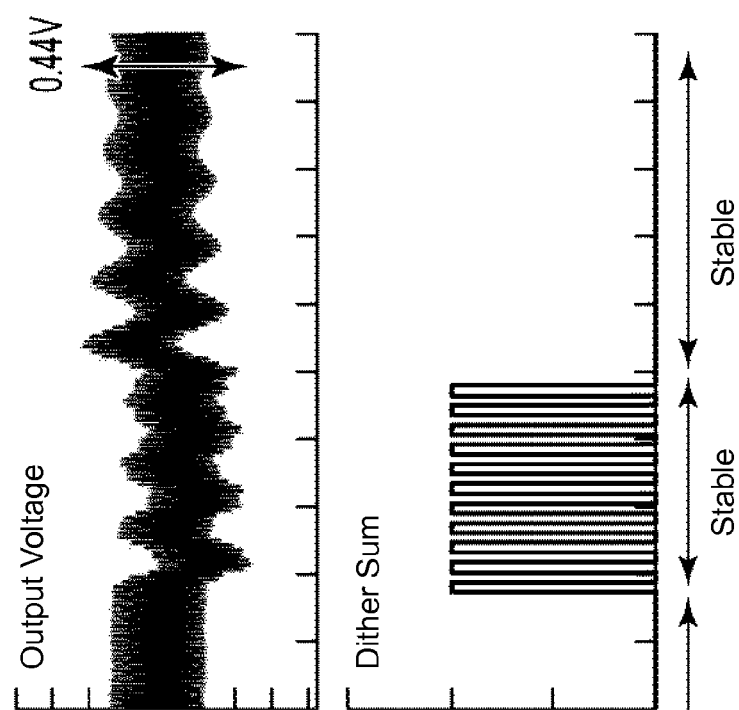
Figure 6:
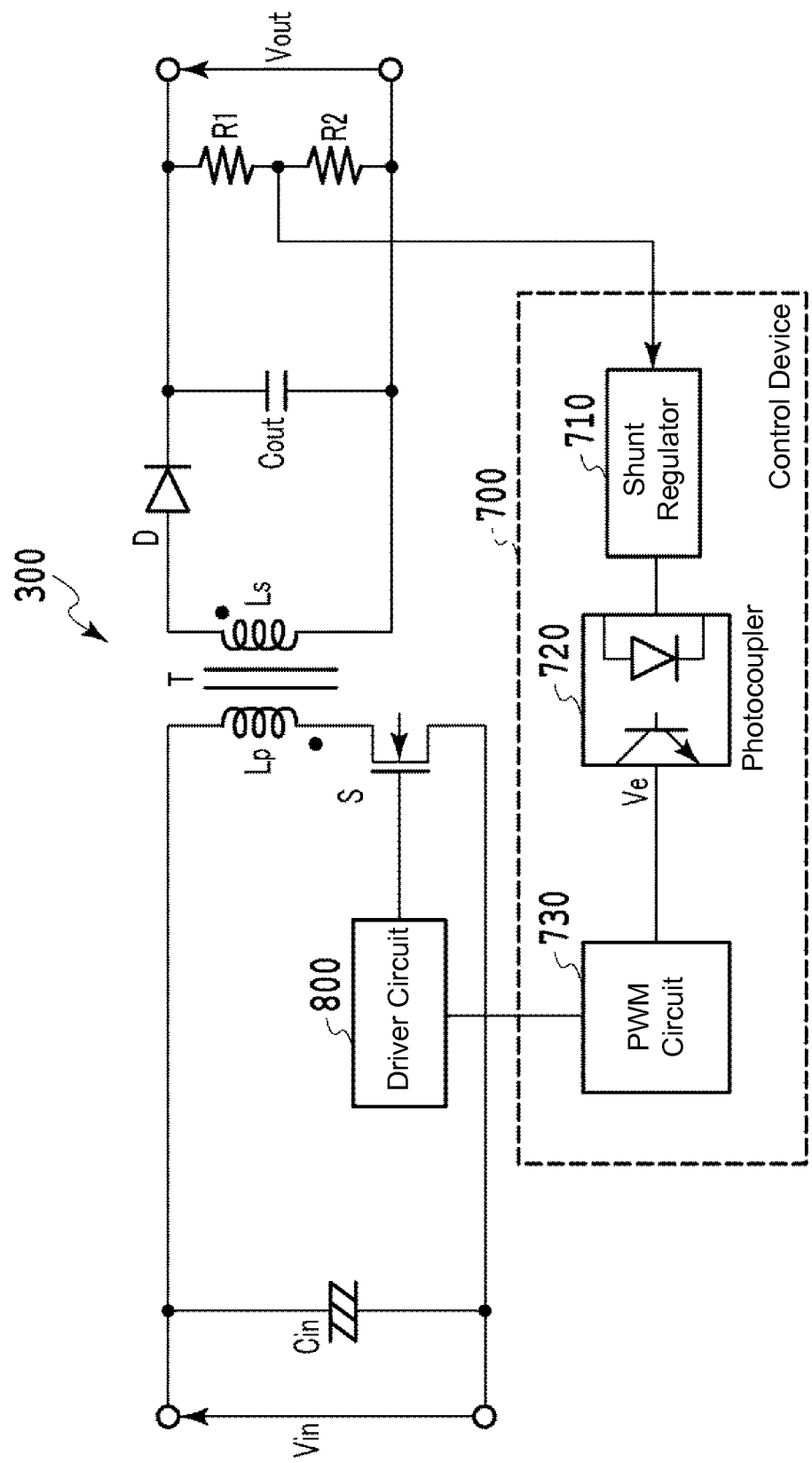
FIG. 6 shows a conventional configuration of an insulation type DC/DC converter and a control device thereof.
Figure 7:
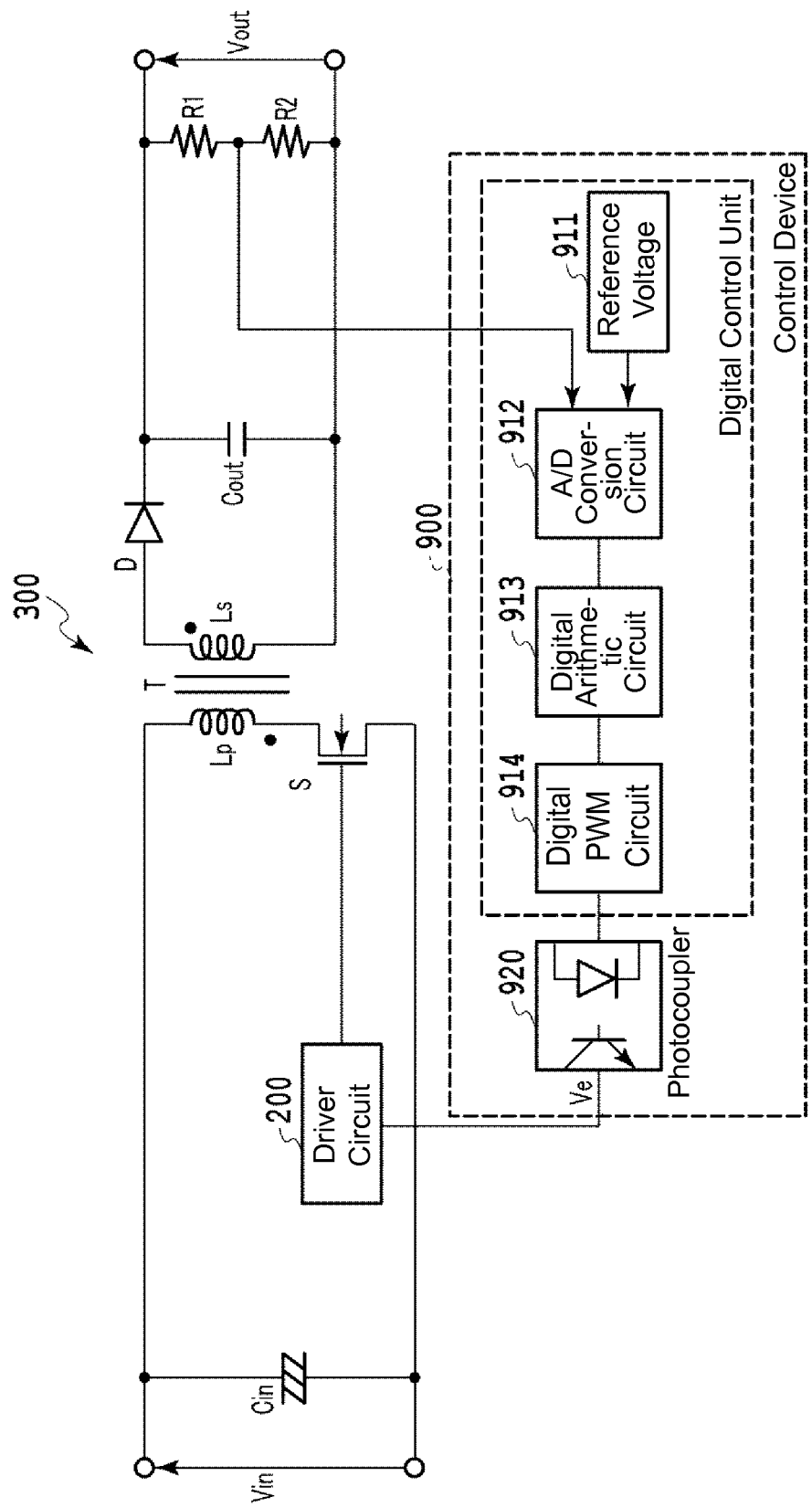
FIG. 7 shows an example of a conventional configuration of an insulation type DC/DC converter and a control device of a fully digital control type.
Figure 8:
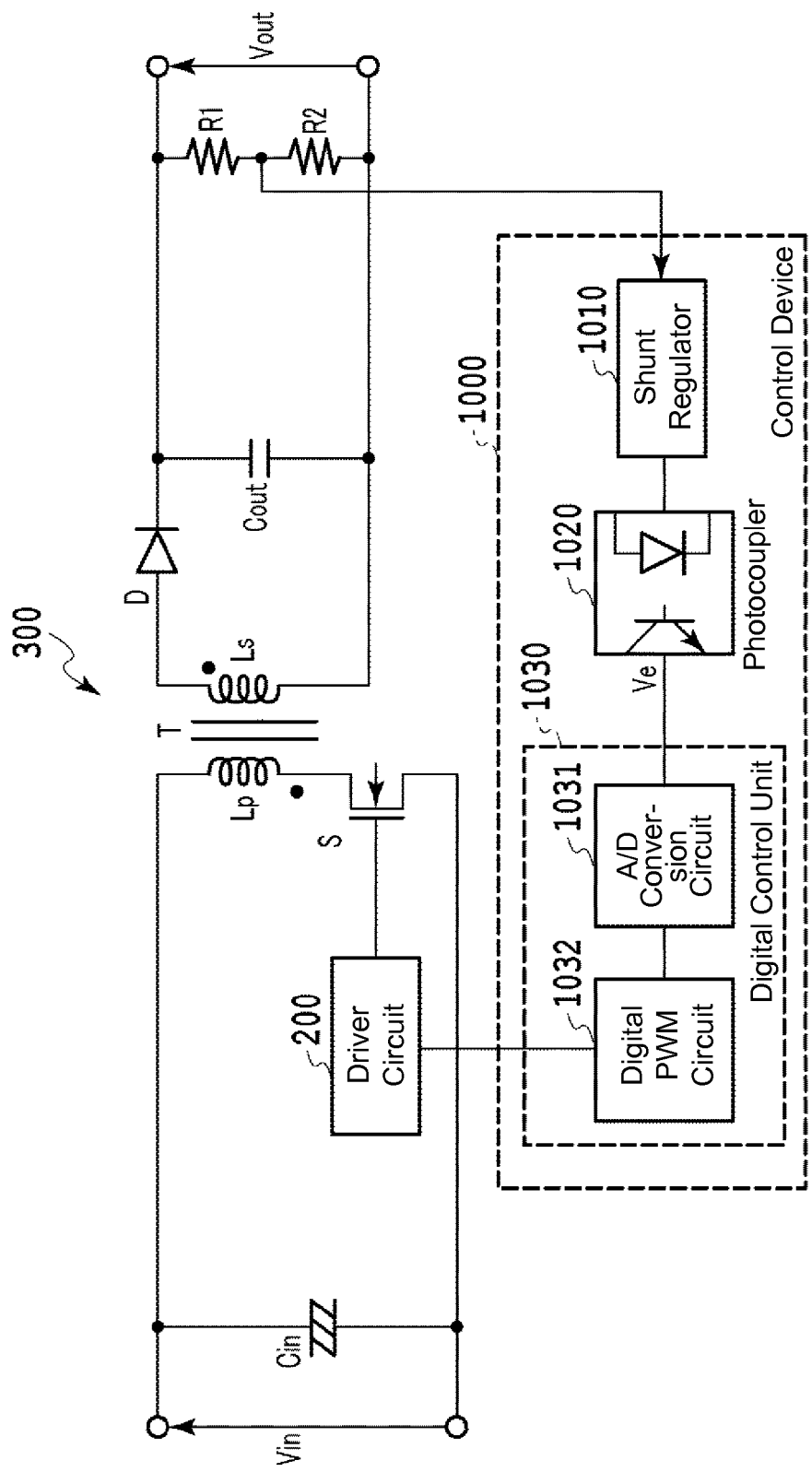
FIG. 8 shows an example of a conventional configuration of a portion of an insulation type DC/DC converter and a control device of a digital control type.

However, in actual operation, the change in output voltage does not increase by two times that of the 12 bit configuration. FIGS. 5A to 5C show simulation results and dither sums of output voltages in the same configurations as shown in FIGS. 4A to 4C. When the output voltage changes due to the change in DPWM output (control), the output voltage undergoes ringing.

If the A/D output stabilization circuit 132 is not provided as in conventional configurations, then as shown in FIG. 5B, control occurs in response to the ringing peak, and thus, the period during which the DPWM output is constant becomes short and the output voltage fluctuation due to control and the ringing width are added together, causing the output voltage oscillation width to be greater than the theoretical value.

On the other hand, by providing the A/D output stabilization circuit as in the present invention, as shown in FIG. 5C, the period during which the DPWM output is constant is lengthened, and the effect of performing control in response to the peak of the ringing during the ringing period can be made small, and thus, the effect of adding together the fluctuation in output voltage due to control and the ringing width can be suppressed.

In this manner, in the present invention, if a 2 bit dither circuit, for example, is used in the DPWM circuit, the power consumption can be reduced to ¼, and the decrease in the output voltage accuracy (oscillation) at this time can be kept at a maximum of 1 bit or less.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A control device for a switching power source, comprising:
    an error amplifier that amplifies a differential between a voltage outputted from a switching power source and a reference voltage;
    an analog/digital converter that converts the differential amplified by the error amplifier to a digital signal;
    an analog/digital output stabilization circuit that outputs an updated digital signal equal to a current digital signal outputted from the analog/digital converter if the digital signal from the analog/digital converter changes more than a prescribed threshold;
    a digital dither circuit that splits a K bit digital signal outputted from the analog/digital output stabilization circuit to an upper digit N bit digital signal and a lower digit M bit digital signal, generates a 1 bit digital signal representing a dither sum on the basis of the lower digit M bit digital signal and switching frequency data, adds the upper digit N bit digital signal to the 1 bit digital signal, and outputs a digital signal obtained by said adding; and
    a digital pulse width modulation circuit that generates a control pulse signal for driving the switching power source on the basis of the digital signal outputted from the digital dither circuit.

2. The control device for the switching power source according to claim 1, wherein said K bits is equal to a sum of N bits and M bits.

3. The control device for the switching power source according to claim 1, wherein an absolute value of the prescribed threshold is 2 LSB or greater.

4. The control device for the switching power source according to claim 1, wherein the digital pulse width modulation circuit includes a comparison circuit that compares a signal outputted from a digital counter circuit to which a square wave outputted from a square wave oscillator is inputted, with a signal outputted from the digital dither circuit.

5. The control device for the switching power source according to claim 2, wherein the digital pulse width modulation circuit includes a comparison circuit that compares a signal outputted from a digital counter circuit to which a square wave outputted from a square wave oscillator is inputted, with a signal outputted from the digital dither circuit.

6. The control device for the switching power source according to claim 3, wherein the digital pulse width modulation circuit includes a comparison circuit that compares a signal outputted from a digital counter circuit to which a square wave outputted from a square wave oscillator is inputted, with a signal outputted from the digital dither circuit.

7. The control device for the switching power source according to claim 1, further comprising:
    an insulating element provided between the error amplifier and the analog/digital converter.

8. The control device for the switching power source according to claim 2, further comprising:

an insulating element provided between the error amplifier and the analog/digital converter.

9. The control device for the switching power source according to claim 3, further comprising:
an insulating element provided between the error amplifier and the analog/digital converter.

10. The control device for the switching power source according to claim 4, further comprising:
an insulating element provided between the error amplifier and the analog/digital converter.

11. The control device for the switching power source according to claim 5, further comprising:
an insulating element provided between the error amplifier and the analog/digital converter.

12. The control device for the switching power source according to claim 6, further comprising:
an insulating element provided between the error amplifier and the analog/digital converter.

13. The control device for the switching power source according to claim 7, wherein the switching power source is an insulation type DC/DC converter.

14. The control device for the switching power source according to claim 8, wherein the switching power source is an insulation type DC/DC converter.

15. The control device for the switching power source according to claim 9, wherein the switching power source is an insulation type DC/DC converter.

16. The control device for the switching power source according to claim 10, wherein the switching power source is an insulation type DC/DC converter.

17. The control device for the switching power source according to claim 11, wherein the switching power source is an insulation type DC/DC converter.

18. The control device for the switching power source according to claim 12, wherein the switching power source is an insulation type DC/DC converter.

* * * * *